April 16, 1968 W. G. TRABOLD 3,378,689

SINGLE TRANSISTOR SYNCHRONOUS BISTABLE MAGNETIC DEVICE

Filed Feb. 20, 1964

INVENTOR.
William G. Trabold
BY
Hugh L. Fisher
ATTORNEY

United States Patent Office 3,378,689
Patented Apr. 16, 1968

3,378,689

SINGLE TRANSISTOR SYNCHRONOUS BISTABLE MAGNETIC DEVICE

William G. Trabold, Royal Oak, Mich., assignor to General Motors Corporation, Detroit, Mich., a corporation of Delaware Filed Feb. 20, 1964, Ser. No. 346,134
3 Claims. (Cl. 307—88)

ABSTRACT OF THE DISCLOSURE

A bistable circuit including two magnetic core devices and a single transistor. A toroidal core is linked by output and read windings. A multiapertured core is linked with set, reset and transfer windings. A passive winding links both cores in opposite sense such that in the set condition, time-staggered transfer and read signals cause complementary magnetic reversals in the cores.

*Summary of the invention*

This invention relates to bistable devices having two output conditions and which may be switched between the two conditions by means of respective signal inputs and, more particularly, to such a bistable device employing high magnetic remanence such that flux established in element such as a transistor.

Synchronous bistable circuits, which are frequently used in the implementation of logic functions, commonly employ two active circuit elements such as transistors or vacuum tubes and a number of resistors and capacitors for providing cross-coupling circuits between the circuit elements. In accordance with the present invention, a synchronous bistable device is provided requiring but a single active element such as a transistor and which does not require the resistive and capacitive cross-coupling circuits. In general, this is accomplished by means of magnetic core means of high magnetic remanence which define a plurality of closed flux paths, a plurality of means such as windings for controlling the flux patterns in these flux paths in accordance with input signals which select the operating state of the device to provide one of two output conditions of discrete character.

Briefly describing the invention, a synchronous bistable device is provided which includes the combination of a first core means for defining a first closed flux path of high magnetic remanence such that flux established in either direction around the flux path tends to persist after the removal of the magnetomotive force which produced the flux. Output circuit means are provided including a winding which links the first flux path and is responsive to flux changes in the path to produce a voltage across the windings which, in turn, produces output signals from the output circuit means. In addition, means are associated with the first flux path for producing flux in one direction in the path. Such means may include a winding linking the path and connected to a source of current pulses. It may be seen that due to the high magnetic remanence of the flux path, no flux change is induced in the path by successive signals unless the direction of remanent flux has been reversed between the signals. The combination further includes a second core means for defining a second closed flux path, also exhibiting a high magnetic remanence. Means are provided for producing flux in one direction about the second path. Such means may include a winding linking the path and a source for inducing current pulses in the winding. In accordance with the invention, such current pulses are produced in a time-staggered relationship with the pulses which are produced in the winding linking the first flux path. The first and second flux paths are magnetically linked by means of a winding which links each of the paths in such a direction that a flux change in one path tends to produce a flux change of opposite direction in the other path. This combination allows, when the device is in one of the two stable states, the first and second flux paths to operate in response to the aforementioned current pulses and synchronously therewith to alternately reverse the direction of remanent flux in the paths. To provide bistable control for this combination, means are provided to block the second flux path to flux induced therein such that the synchronous flux reversal operation is terminated. Accordingly, the device may be placed in one of the stable states. Further means are provided for selectively unblocking the second flux path such that the synchronous flux reversal operation may be resumed. Thus, the device may be placed in the other of the stable states.

The invention and the operation thereof may be best understood by describing the implementation and operation of a specific embodiment thereof. Such a specific embodiment is described in the following specification and is shown in the accompanying drawings of which:

Figure 1:
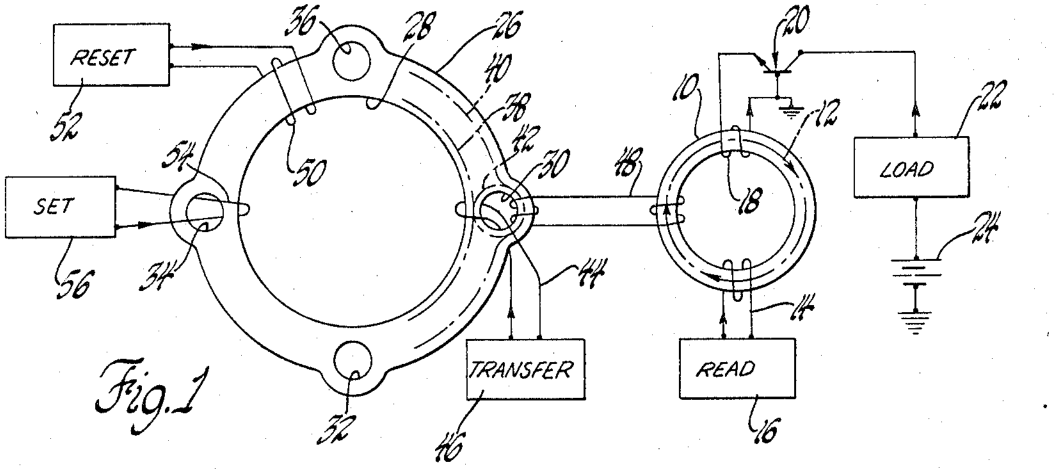
FIGURE 1 is a schematic diagram of the specific embodiment of the invention employing two magnetic cores and a single active circuit in the form of a transistor.

The present invention is specifically embodied, as shown in FIGURE 1, in a synchronous bistable device which is operable in a "set-reset" mode to produce, when in the "set" condition, an output signal comprising a train of signal pulses and for producing, when in the "reset" condition, a constant level zero potential output signal.

Figure 2:
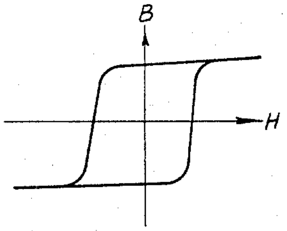
FIGURE 2 is a representation of the magnetic characteristics of the material from which the cores shown in FIGURE 1 are made.

Referring more specifically now to FIGURE 1, the embodiment of the invention shown includes the combination of an annular core 10 of magnetic material exhibiting the substantially square loop characteristics shown in FIGURE 2. The core 10 is in the form of an annular ring for providing a closed flux path as indicated at 12. Flux in the path 12 may be induced in a counterclockwise direction by means of the combination of a winding 14 which links the path 12 and a source 16 of periodic current pulses which may be referred to for purposes of discussion as "read" pulses. Because of the high magnetic remanence of the material of core 10, it may be seen that once core 10 is saturated by a current pulse induced in winding 14, subsequent pulses of the same polarity from the source 16 will not effect a flux change in the path. However, if the flux in path 12 has been reversed between successive pulses in winding 14, corresponding flux changes result.

To sense the flux changes in path 12, an output circuit is provided including a winding 18 which links the path 12 and which is further connected across the input circuit consisting of the base and emitter electrodes of a transistor 20. The output circuit, that is, the emitter-collector circuit of the transistor 20, is connected in series with a load 22 and a DC source 24. As indicated in FIGURE 1, the positive terminal of the source 24 is connected through the load 22 to the collector of transistor 20. The negative terminal of the source 24 is connected to ground. As further described in the following description of operation, the transistor 20 is responsive to voltage pulses of a particular polarity induced in winding 18 to become momentarily conductive across the output circuit to thereby complete a circuit from the positive terminal of the source 24 through the load 22.

Continuing with the description of FIGURE 1, there is shown a second core 26 which is also made of magnetic material exhibiting the characteristics shown in FIGURE 2. The core 26 has formed therein a central major aperture 28 and four minor apertures 30, 32, 34 and 36, which are located at 90° intervals about the annulus defined by the major aperture 28 and which are adjacent thereto. As suggested by the broken lines in FIGURE 1, the combination of apertures defines two flux paths 38 and 40 about the major aperture 28 of which path 40 is the longer due to the fact of its having a greater radius from the center of the core 26. The minor aperture 30 also defines an additional flux path 42 which encircles the aperture 30 and which intersects and includes a portion of each of the major flux paths 38 and 40. As is well known to those skilled in the art, the magnetomotive force which is required to switch or change the direction of flux in a magnetic circuit is proportional to the length of the magnetic circuit. Thus, referring to FIGURE 1, it may be seen that the flux in path 42 is subject to control by the flux in the paths of greater length 38 and 40. Similarly, it requires a greater magnetomotive force to switch the flux in path 40 than to switch the flux in path 38.

The flux in path 42 may, under certain conditions to be described in the following, be controlled by current in a winding 44 which links the path 42. Current in winding 44 may be produced by means of a source 46 which is adapted to produce periodic current pulses which, for purposes of discussion, will be referred to as "transfer" pulses. The transfer pulses from source 46 and the read pulses from source 16 occur alternately in a time-staggered relationship as will be further discussed in the following. It may be seen that due to the particular direction of the winding 44 around the path 42 current pulses in the direction indicated by the arrow on winding 44 tend to produce flux in a counterclockwise direction about the aperture 30.

For the purpose of communicating the flux changes in path 42 to path 12, a mutual winding 48 links paths 42 and 12 in opposite directions as shown. In this configuration, the winding 48 is responsive to a flux change in one path to tend to produce a flux change of opposite direction in the other path.

The direction of flux in paths 38 and 40 is subject to establishment by means of a reset winding 50 which surrounds the core 26 to thereby link both of the paths 38 and 40. The winding 50 is connected to a source 52 which may be selectively energized to produce reset current pulses in the winding 50 in the direction shown by the arrow. Such pulses are effective to establish flux in paths 38 and 40 in a clockwise direction about the major aperture 28. A second control winding 54 links a portion of the core 26 as defined by the minor aperture 34. As shown, winding 54 is connected to a source 56 which is selectively energizable to produce one or more set pulses. It is to be understood that the sources 52 and 56 are independently actuatable and are used as two mutually exclusively inputs to control the operating condition and state of the bistable device shown in FIGURE 1.

It was stated above that the magnetic characteristics of the cores 10 and 26 are as shown in FIGURE 2. Materials which exhibit the magnetic characteristics as shown in FIGURE 2 are well known and are commonly employed in the production of magnetic core elements such as are used in computers and other logic functions. Having such a characteristic as shown in FIGURE 2, each of the cores 10 and 26 is capable of being placed in two stable states by means of current pulses from which stable states the cores will not return until the occurrence of a driving force which tends to reverse the direction of flux established in the core. Also pertinent is the fact that once either of the cores 10 or 26 or any portion thereof is placed in one of the stable states a subsequent magnetomotive or driving force which tends to produce flux in the established direction results in only a negligible flux change. Thus, an output winding linking the flux path which is so uneffected will experience no induced voltage.

Figure 3:
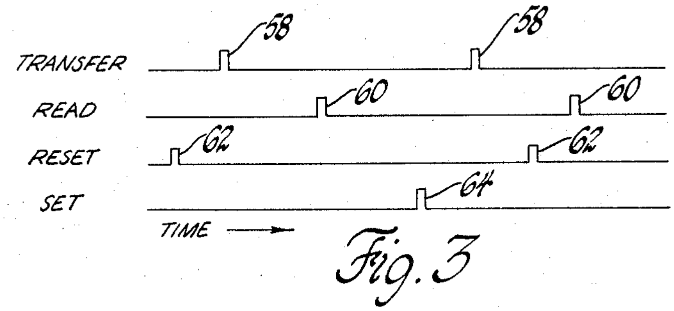
FIGURE 3 is a chart indicating the suggested times of occurrence of the various signals which occur in the circuit of FIGURE 1.

Discussing the operation of the circuit shown in FIGURE 1 in light of the fundamentals reviewed above, it may be assumed that the sources 16, 46, 52 and 56 are effective to produce pulses according to the time schedule shown in FIGURE 3. The source 46 produces transfer pulses 58 at a predetermined clock rate and at an amplitude which is set in accordance with principles brought to light in the following. The source 16 produces read pulses 60 in the winding 14 at a predetermined clock rate which corresponds with that of the source 46. It is to be noted from FIGURE 3 that the pulses 60 occur intermediate the pulses 58. When the device shown in FIGURE 1 is in the set state, the output pulses which are produced by the output circuit including transistor 20 occur synchronously with the pulses 60. Source 52 is effective to produce reset pulses 62 while source 56 produces set pulses 64. It is to be understood that the reset and set pulses 62 and 64 may occur at any time and are not time dependent. However, it is to be further understood that a specific time relationship may be established by means of extraneous apparatus and conditions which are not considered to be part of the present invention.

Figure 4:
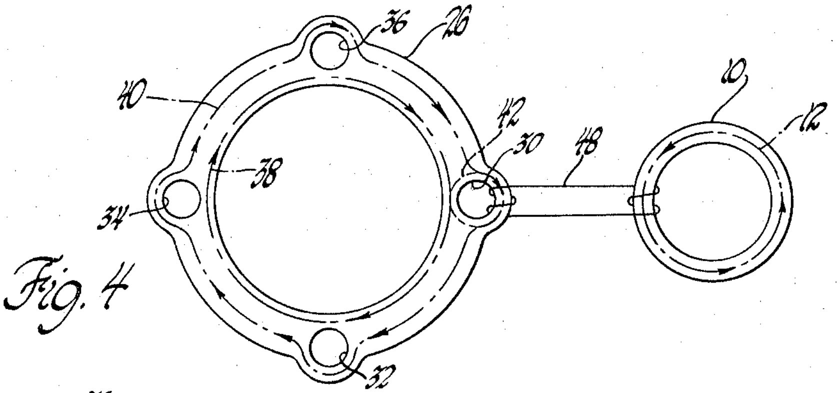
FIGURE 4 is a representation of the cores shown in FIGURE 1, further indicating the direction of flux in the cores under a first set of circumstances.

Referring now to FIGURE 4, the operation of the invention shown in FIGURE 1 is first described in the reset condition. This condition is brought about by the occurrence of a pulse 62 on winding 50 which is connected with source 52. The current pulse 62 in the direction shown by the arrow is chosen to be of a sufficient magnitude to set up a clockwise remanent flux condition in the paths 38 and 40 as indicated by the direction of the arrows in FIGURE 4 irrespective of past history of the core 26. The response of the system, when placed in the reset condition, to the alternately occurring clock drive pulses 58 and 60 from sources 46 and 16, respectively, is such that no current flows through the load 22 from the source 24.

Explaining further this response, it can be seen that the transfer pulse 58 on winding 44 tends to produce flux in path 42 in a counterclockwise direction. The magnitude of the transfer pulse 58 is chosen such that it is insufficient to reverse the direction of flux in path 40. The counterclockwise flux in path 42 is in the same direction as the flux in path 38. Accordingly, the path 42 is effectively blocked since path 38 appears as an open circuit to the flux in path 42. Accordingly, no voltage is produced in that portion of winding 48 which links path 42. It follows that no flux-producing current is induced in that portion of winding 48 which links path 12 in core 10. Therefore, the read pulses 60 which are produced in winding 14 have no effect on the flux magnitude or direction in path 12 since the first of the read pulses established flux in a counterclockwise direction as indicated in FIGURE 4. Since the flux in 12 does not change with the occurrence of the read pulses 60, no voltage is induced in winding 18 to bias transistor 20 to a conductive state. The reset state is, thus, established by a reset pulse 60 to affect the system shown in FIGURE 1 such that a steady state signal of zero potential across load 22 results.

Figure 5:
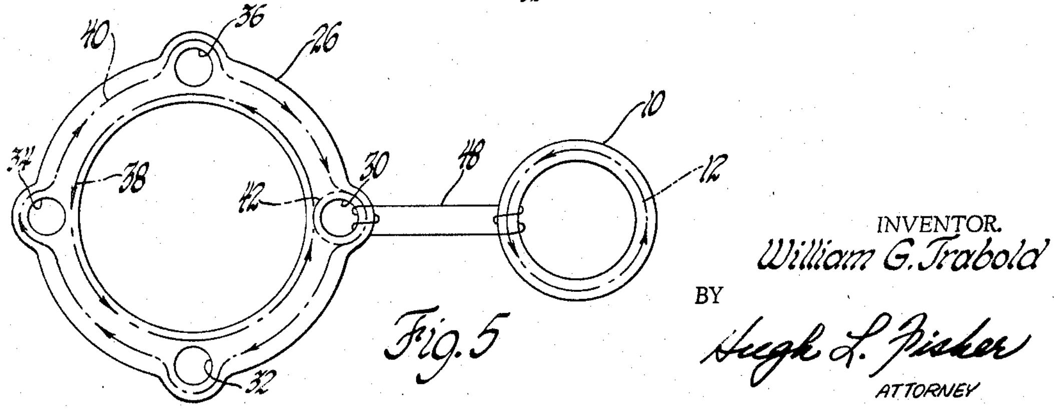
FIGURE 5 is a representation of the cores shown in FIGURE 1, further indicating the flux conditions therein under a second set of circumstances.

Looking now to FIGURE 5 with reference to FIGURES 1 and 3, the response of the device to the clock pulses from the transfer and read sources 46 and 16 will be described. The set pulse 64 on winding 54, which may occur at any time, reverses the direction of flux only in path 38 shown in FIGURE 5. This is due to the fact that winding 54 links a portion of the core 26 having a cross-sectional area of only one-half the total area. Thus, winding 54 may link either the outer or inner portion of the core 26 with the result being the same. With the conditions as shown in FIGURE 5, the flux path 42 is unblocked. Upon the occurrence of a transfer pulse 58, the counterclockwise flux around path 42 which is produced thereby, is opposite in direction to both the established flux paths 38 and 40. Thus, a closed circuit is encountered for the flux in path 42. The result of the transfer pulse is to reverse the direction of flux in path 42 as established by the fluxes in paths 38 and 40. It is believed that the flux in path 40, while not reversed around the entire portion of the core 26, is caused to double back upon itself in the vicinity of the aperture 30. Accordingly, the transfer pulse 58 is effective to produce a flux change which induces a voltage in that portion of the winding 48 which links the path 42. Because of the reverse direction of the winding around the core 10, the signal in winding 48 tends to produce a clockwise flux in path 12. This clockwise flux reverses the direction of flux in path 12 and induces a voltage in the output winding 18 in such a direction that the emitter-base junction of transistor 20 is reverse biased and no load current flows. However, upon the occurrence of the following read pulse 60, the direction of flux in path 12 is again reversed to a counterclockwise direction as shown in FIGURE 5. The voltage which is induced in the output winding 18 by such a flux reversal forward biases transistor 20 such that a current flows from source 24 through the load 22. This action results in the drawing of load current which will continue to flow through the load 22 until the emitter-base voltage induced in winding 18 falls below that required to produce base current to the transistor 20. The output of the device is, thus, a current pulse which is coincident with the clock read pulse 60.

Assuming that no reset pulse 62 occurs until the subsequent transfer pulse reoccurs, the system is effective to continue to produce output current pulses in the manner described in the following. The flux reversal produced by the read current pulse 60 also induces a voltage in that portion of winding 48 which links core 10. This voltage is delivered through that portion of the winding 48 which links path 42 to reverse the direction of flux in path 42 to a clockwise direction. Thus, the following transfer pulse 58 again reverses the direction of flux in path 42 and sets up core 10 to produce another output pulse upon the occurrence of a following read pulse 60. This operation continues with the resultant production of a train of pulses coincident with the read pulses 60 until the occurrence of another reset pulse 62 on winding 50.

The minor apertures 36 and 32 of core 26 may, in accordance with the principles announced in the foregoing description of the specific embodiment of the invention, be linked with additional set windings, and additional reset windings may be placed on the core 26. Such additions would allow the set and reset functions to be logically combined to form an OR circuit.

While the invention has been described with respect to a specific embodiment thereof, various modifications and additions, such as suggested above, may be apparent to those skilled in the art and, therefore, the description is not to be construed in a limiting sense. For a definition of the invention, reference should be had to the appended claims.

What is claimed is:

1. Bistable switching apparatus comprising: first core means of high magnetic remanence defining a first closed flux path, an output winding linking said path and responsive to flux changes therein to produce output voltage signals, output circuit means connected to receive the output signals and responsive to signals of a predetermined character to activate a load, a read winding linking the first path, first generator means connected to the read winding for producing periodic current therein tending to produce flux in one direction in the first path, second core means of high magnetic remanence defining second and third closed flux paths of different length and having an aperture therein defining a fourth closed flux path intersecting and including a portion of each of the second and third flux paths, a reset winding linking the second and third flux paths, second generator means connected to the reset winding for producing periodic current therein tending to produce flux in one direction in the second and third paths, a set winding linking the second and third flux paths, third generator means connected to the set winding for producing current therein to produce flux in the opposite direction in the shorter of the second and third paths, a transfer winding linking the fourth path, fourth generator means connected to the transfer winding for producing current therein tending to produce flux in said fourth path in the direction opposite to the flux in the intersected portion of the longer of the second and third paths, and passive winding means linking the fourth flux path with the first flux path whereby a flux reversal in the fourth path tends to produce a flux reversal in the first path and conversely.

2. Bistable switching means as defined in claim 1 wherein said output circuit means includes a transistor having the input circuit connected across the first winding, a source of electrical energy and a load connected in circuit with the source and the output circuit of the transistor whereby the load is activated when the transistor is conductive.

3. Bistable switching means for producing output signals of different character in response to two mutually exclusive input signals comprising: a first toroidal magnetic core of square loop material defining a first closed flux path, output circuit means including a first winding linking the first path and responsive to flux changes to produce output signals, a second magnetic core of square loop material having formed therein a major aperture defining second and third closed flux paths of different length about the aperture and a minor aperture adjacent the major aperture defining a fourth closed flux path which intersects and includes a portion of each of the second and third flux paths, second and third windings linking the first and fourth flux paths respectively, means for producing current pulses alternately in the second and third windings tending to produce flux in one direction in the first and fourth flux paths, a fourth closed passive winding linking the first path with the fourth path whereby a flux change in one path tends to produce a flux change of opposite direction in the other, a fifth winding linking the second and third flux paths, means to selectively produce a current pulse in the fifth winding tending to produce flux in one direction in the second and third paths thereby to block the fourth flux path to flux produced by current in the third winding, a sixth winding linking at least a portion of the second magnetic core, means to selectively produce current pulses in the sixth winding tending to produce flux in the opposite direction in the shorter of the second and third flux paths thereby to unblock the fourth flux path to flux produced by current pulses in the third winding.

References Cited

UNITED STATES PATENTS

| | | | |
|---|---|---|---|
| 3,296,601 | 1/1967 | Fritz | 340—174 |
| 3,292,163 | 12/1966 | Engelbart | 340—174 |

BERNARD KONICK, *Primary Examiner.*

STANLEY URYNOWICZ, *Examiner.*